United States Patent [19]

Carlson

[11] Patent Number: 4,688,498
[45] Date of Patent: Aug. 25, 1987

[54] APPARATUS AND METHOD FOR DETECTING POSITION OF EMBROIDERY MACHINE AFTER POWER FAILURE

[75] Inventor: Gilbert E. Carlson, Asheville, N.C.

[73] Assignee: Conrad Industries, Inc., Weaverville, N.C.

[21] Appl. No.: 2,453

[22] Filed: Jan. 12, 1987

[51] Int. Cl.⁴ .......................... D05C 9/06; D05B 21/00
[52] U.S. Cl. ............................... 112/103; 112/121.12; 112/266.1
[58] Field of Search ....................... 112/121.12, 121.11, 112/275, 277, 102, 103, 266.1; 364/400, 470

[56] References Cited

U.S. PATENT DOCUMENTS 4,365,565 12/1982 Kawai et al. ............... 112/121.12 X
4,388,882 6/1983 Yamamoto et al. ............ 112/121.12
4,413,574 11/1983 Hirota et al. .................... 112/121.12
4,478,160 10/1984 Ohniwa ........................... 112/121.12

*Primary Examiner*—Peter Nerbun
*Attorney, Agent, or Firm*—David M. Carter

[57] ABSTRACT

There is provided a method and apparatus for detecting the position of an embroidery machine after power failure. A position encoder is connected to each frame drive actuator on each axis of the embroidery machine. The computer which controls the actuators is equipped with a non-volatile memory. The encoders indicate to the computer the current position of the actuators and thus the frame. When power returns, the current position value from each encoder is compared with the required position value in the computer memory. If the values are not equal, machine start-up is inhibited and the computer commands the actuators to cause the frame to be moved to its proper position.

15 Claims, 4 Drawing Figures

APPARATUS AND METHOD FOR DETECTING POSITION OF EMBROIDERY MACHINE AFTER POWER FAILURE

BACKGROUND OF THE INVENTION

This invention relates to electronically controlled embroidery machines. More particularly, it relates to such embroidery machines which are subject to power interruptions.

Embroidery machines utilize a large heavy frame with a plurality of sewing needles for simultaneously embroidering on a span of fabric. The stitch design is determined by the movement of the frame between each needle stroke. The frame is driven in the x and y direction by large motors which are connected to the control apparatus by couplings such as rack and pinion or ball screws.

For many years, embroidery machines have been controlled by mechanically read punched tape operating linkages. Those types of machines are often referred to as Schiffli machines. However, modern embroidery machines are now being controlled electronically by computers.

Examples of computer-controlled embroidery machines are disclosed in U.S. Pat. No. 4,221,176, issued to Besore et al.; U.S. Pat. No. 4,365,565, issued to Kawai et al.; U.S. Pat. No. 4,391,211, issued to Yamamoto et al.; U.S. Pat. No. 4,413,574, issued to Hirota; and U.S. Pat. No. 4,478,160, issued to Ohniwa. These computer controlled embroidery machines, many of which use stepper motors with a large number of discrete movements per revolution, are more accurate and operate at higher speeds than mechanically controlled machines.

One of the problems which occurs with all embroidery machines but is a particular problem with electronically controlled embroidery machines has been situations where power is cut off to the machine while the machine is in operation. In certain parts of the country, these power outages or reductions in voltage, which will effectively provide the same results, occur quite often; in some cases, as often as 30 to 40 times annually. Loss of power to an electronically controlled embroidery machine may result in two kinds of problems: (1) loss of pattern continuity, which is also referred to as "shifting", and (2) misalignment of the tandem motors which are often used to drive the same axis of the frame. The problem results in destroyed product and loss of production time. In a closed loop system, the problems occur because the controller or computer loses the value of the desired frame position. In an open loop system, the problem is further complicated by the fact that there is no feedback information giving the present location of the frame.

One solution is to provide a source of uninterruptable power to the control circuitry and to the stepper motors. This is very expensive and most uninterruptable power supplies are limited in the amount of time that they can maintain a load. Another solution is to apply a brake to the stepper motors at the first indication of a power loss; however, this solution would only be applicable if the frame is not in motion when the power loss occurs. If the frame is in motion, the braking action is not predictable from one time to the next and from one motor to the next.

OBJECTS OF THE INVENTION

It is therefore one object of the invention to provide an embroidery machine control system which is accurate even after a power failure.

It is still another object to provide a system indicating an embroidery machine is not in proper position after a power failure.

It is another object to provide an inexpensive and accurate method of ensuring that an embroidery machine is in its proper position after a power loss.

It is still another object to provide an improved method and apparatus for accurately repositioning the frame of the embroidery machine after power loss occurs.

SUMMARY OF THE INVENTION

In accordance with one form of this invention, there is provided a system for providing positioning indication for an electronically controlled embroidery machine. The embroidery machine includes a frame and at least one actuator motor for initiating the movement of the frame.

The system includes a controller connected to the actuator. The controller is adapted to be programmed to provide a plurality of commands to the actuator for moving the frame to predetermined positions. The controller includes a memory, at least a part of which is non-volatile. The memory stores the last command to the actuator. A position encoder is connected to the actuator and to the controller. The position encoder indicates the current position of the actuator to the controller. The controller includes means for comparing the position information in the memory with the position information provided by the encoder. If the compared information is not the same, the machine will not start up, and the frame is either manually or automatically moved to its proper position as determined by the position information in the memory of the controller. An interface circuit may be provided between the position encoder and the controller for determining the direction and incremental steps of the actuator. The total accumulation of steps may include multiple rotations.

BRIEF DESCRIPTION OF THE DRAWINGS

The subject matter which is regarded as the invention is set forth in the appended claims. The invention itself, however, together with further objects and advantages thereof, may be better seen in reference to the following description taken in conjunction with the accompanying drawings, in which:

DESCRIPTION OF THE PREFERRED EMBODIMENTS

Figure 1:
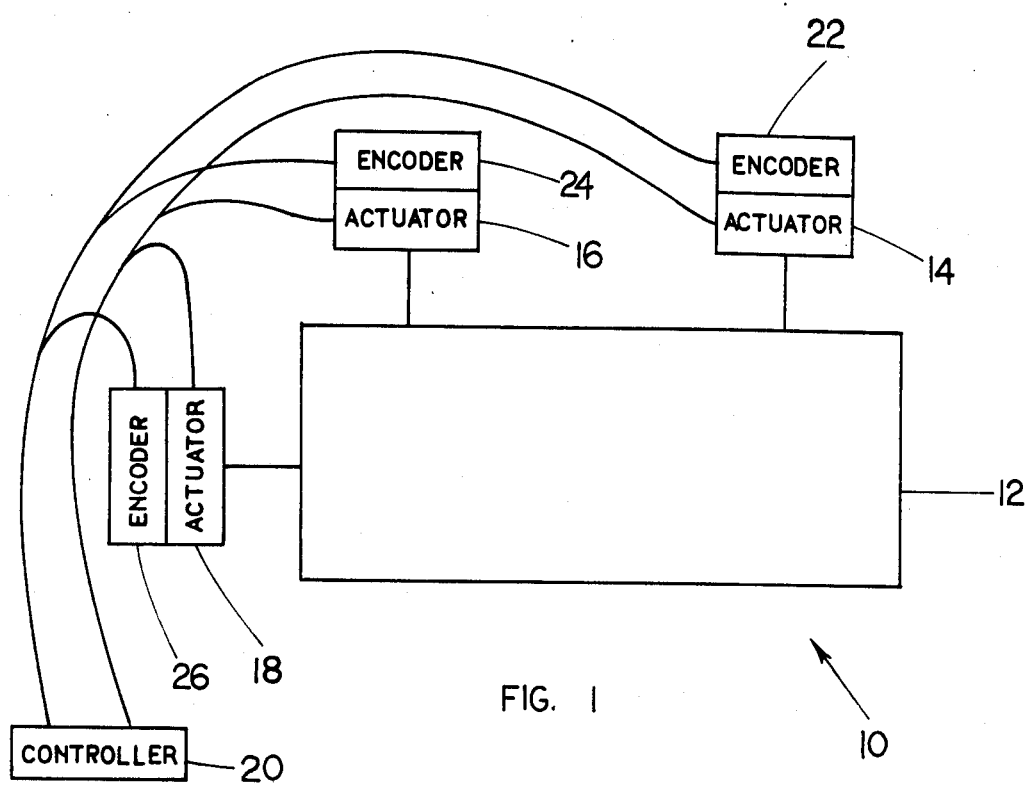
FIG. 1 is a block diagram showing the system of the subject invention for use with three drive actuators.

Referring now more particularly to FIG. 1, there is provided embroidery system 10 including frame 12 containing a plurality of embroidery needles (not shown). The apparatus which forms part of the frame may include standard Schiffli embroidery machine hardware and various drive means such as rack and pinion or ball screw known to those skilled in the art and is omitted for simplification.

The system includes three frame drive actuators 14, 16, and 18. Actuators 14 and 16 move the frame in the y-axis, while actuator 18 moves the frame in the x-axis. The frame drive actuators preferably are stepper motors which permit 1,000 incremental moves per revolution, which translates to 1/30 mm movement for a standard Schiffli frame. A commonly used stepper motor such as those commercially available from the Superior Electric Company are acceptable.

The stepper motors 14, 16, and 18 are connected to and are controlled by controller 20. Controller 20 is a standard programmed microprocessor system with each program being different, depending upon the desired embroidered pattern. The microprocessor system may include an 8-bit microprocessor and assorted memory, commercially available from Prolog, Inc.

The system includes position encoders 22, 24, and 26 respectively attached to actuators 14, 16, and 18. The preferred position encoder is a quadrature encoder, ccmmercially available from DISC Instruments, Inc. The position encoders detect incremental movements and direction of each frame drive actuator and the preferred encoder provides the two output pulses A and B shown in FIG. 4, which will be discussed below. The position encoders are connected to controller 20 for providing positional information to the controller.

Figure 2:
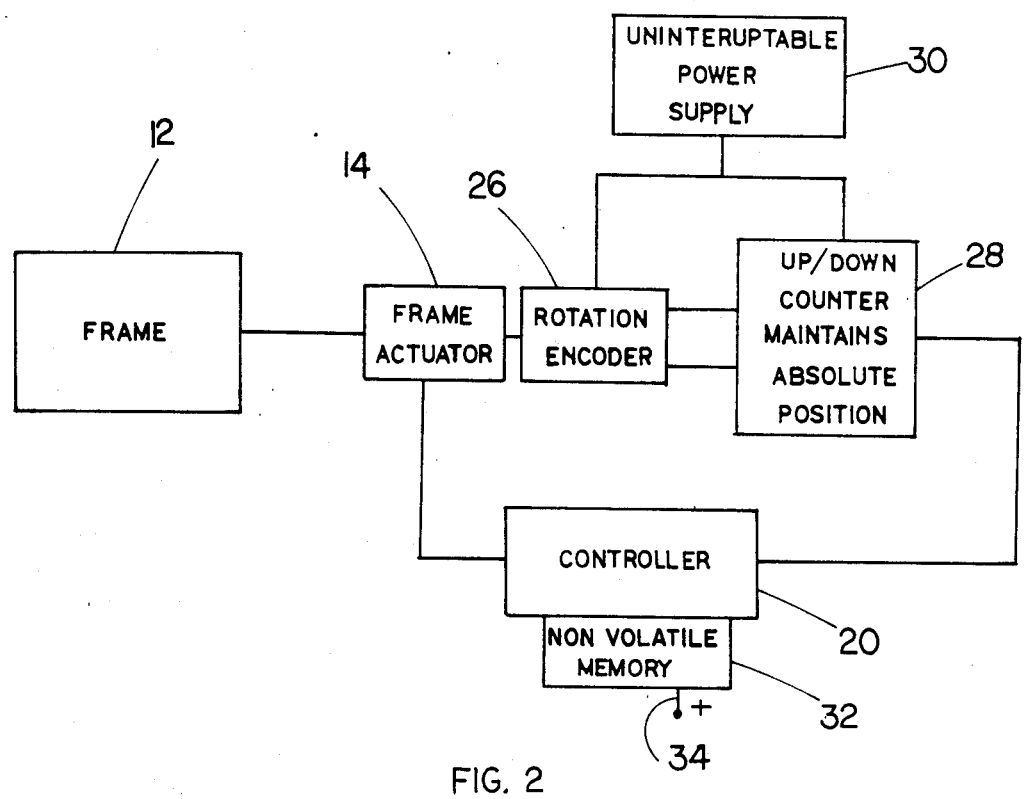
FIG. 2 is a block diagram of the system of FIG. 1 but showing the system associated with each frame actuator in more detail.

Preferably, an interface circuit 28 is connected between the position encoders and the controller, as shown in FIG. 2. However, if one utilizes a more sophisticated and extensive position encoder such as a Digisolver, commercially available from the Autotech Corporation at a much higher cost, the interface circuitry 28 may be substantially eliminated. However, with the current cost difference being a factor of 10, it is preferred to use the less sophisticatd position encoder and the interface circuitry to analyze the output from the position encoder and to provide usable information to the controller concerning the position of the stepper motors.

The position encoders 22, 24 and 26, as well as the interface circuitry 28 are connected to an uninterruptable power supply 30. The uninterruptable power supply may be a battery, with charging and circuitry, sized large enough to provide power during sustained power interruptions. Thus, even during power interruption, the encoders will provide data to the interface circuitry indicating the position where the actuators come to rest. The interface circuit in turn will provide the analyzed data to the controller 20 after main power has returned. Thus, the data is stored in counters which are contained in the interface circuitry 28 during power outage, which will be explained below.

Controller 20 includes a non-volatile memory 32, which is connected to a small separate battery 34. The non-volatile memory is programmed with the desired frame positional information for the controller, and will remain in memory even if there is a power outage. The interface circuitry 28 determines the position of frame actuator 14, as well as the other frame actuators 16 and 18.

Figure 4:
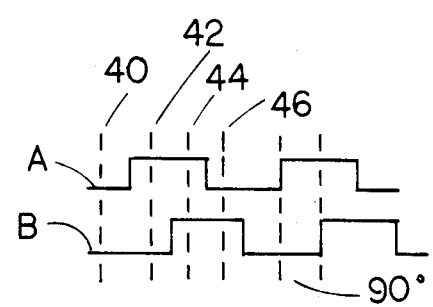
FIG. 4 shows the output wave forms from the position encoders of FIG. 1.

As can be seen from FIG. 4, the encoders provide two output signals, both of which are square waves A and B, which are 90° out of phase. Lines 40, 42, 44, and 46 indicate the times at which samples are taken by the interface circuit 28 of the outputs of the position encoder. As can be seen from the sample lines, the possible combinations are A low and B low, A high and B low, A and B high, or A low and B high. Whenever the instantaneous status of these two signals change from one of the four possible combinations to another, the interface circuit can record or count one discrete increment or rotation and the direction of rotation.

Figure 3:
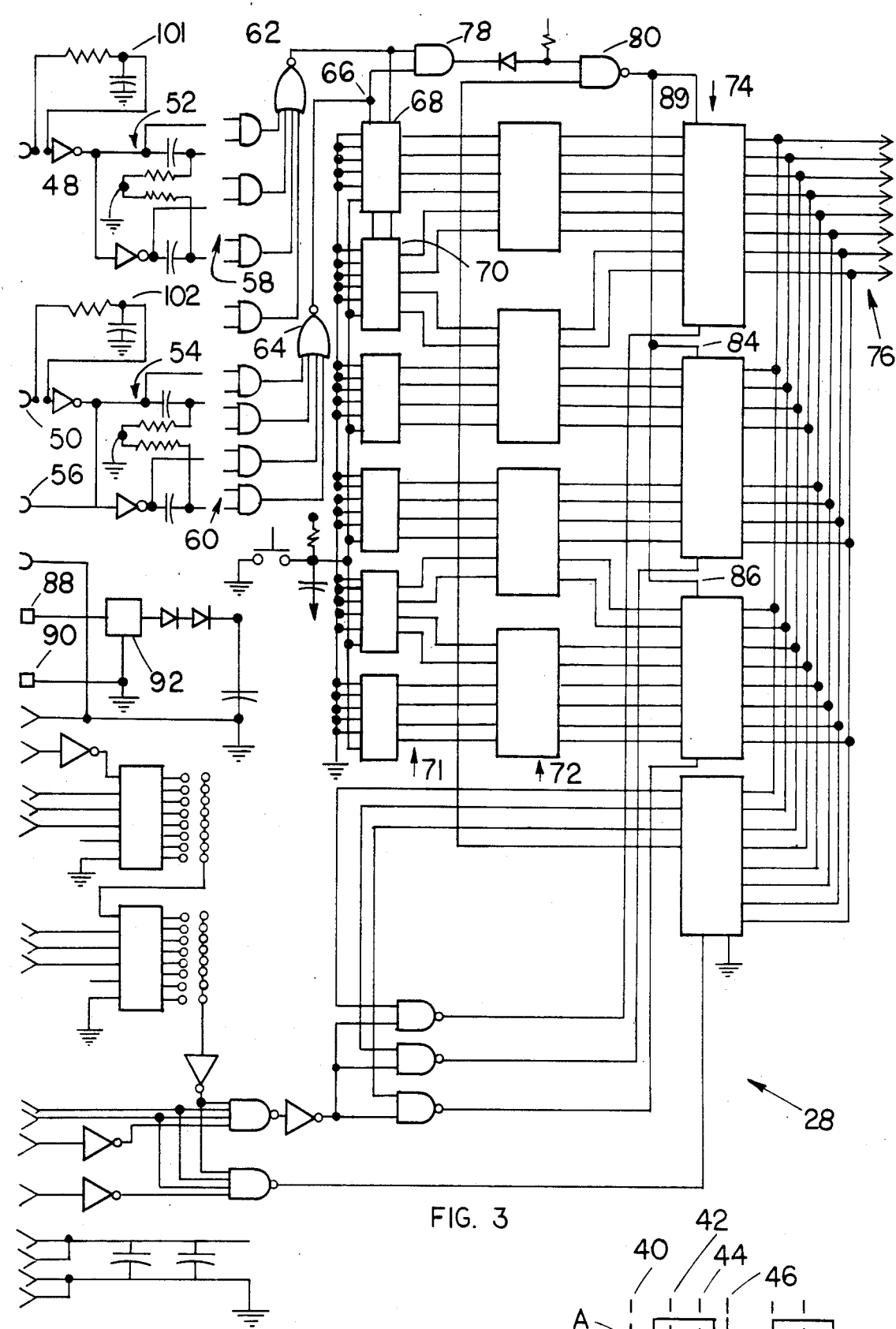
FIG. 3 is a schematic circuit diagram showing the details of the interface circuitry between the position encoder and the controller.

Referring now to FIG. 3, there is provided interface circuit 28, including input terminals 48 and 50, which are connected to the output of a particular position encoder. There is one such interface circuit for each position encoder. Input terminal 48 will receive signal A, and input terminal 50 will receive signal B. Signals A and B are filtered by circuits 101 and 102 and shaped by circuits 52 and 54, which have output, signals which are either high or low and outputs indicating that the signal is in a high or low transition. A source of uninterruptable power 30 is connected to the interface circuit 28 through terminals 88 and 90, which, in the preferred embodiment, is a 12-volt battery and and charging circuitry. Two banks of AND gates 58 and 60 are provided for performing logic functions on signals A and B. The outputs of AND gates 58 are connected to NOR gate 62, while the output of AND gates 60 are connected to NOR gate 64. The outputs of NOR gates 62 and 64 are connected to a group of counters 66 which, as can be seen, are connected in a cascade configuration. Thus, counter 68 counts the first four binary digits, counter 70, the next four, etc. The counters 66 count incremental movement, positive or negative, of the actuator as determined by its corresponding position encoder. The counter should have sufficient counting space to permit several revolutions of the actuator since, in the preferred embodiment, there are 1,000 incremental steps per revolution of the stepper motor. Thus, one revolution is indicated for each 1,000 counts in a particular rotation. The output 71 of the counters 66 are connected to a group of voltage interface circuits 72, which interface between the 12-volt noninterruptable power supply and a 5-volt system which is utilized by the controller 20. Information from the counters is stored in data latches 74, which lock-in an output signal indicating a specific incremental position of the actuator when power is restored. That information is provided on output terminals 76, which are in turn connected to controller 20, as shown in FIG. 2.

As can be seen from FIG. 3, the outputs of NOR gates 62 and 64 are connected to the input of AND gate 78, the output of which is connected to AND gate 80. AND gate 80 is connected to the clocking input 82, 84, and 86 of the data latches 74. These data latches hold the count data to be used by the processor. The circuitry below the counter and terminals 88 and 90 is used by the controller to address this interface circuit as a port and display the data to the controller at the proper time.

The source of uninterrupted power 30 is a battery connected across terminal 88 and 90 and then across regulator circuit 92 for providing 12 volt regulated voltage to terminal 56.

The system described above is operated as follows: During normal power operation, controller 20 causes the frame actuators 14 and 16 to move frame 12 in the Y direction and causes the actuator 18 to move the frame in the X direction in order to produce embroidered articles pursuant to the programming of the controller.

When power is interrupted, actuators 14, 16, and 18 cease operation; however, the momentum of the actuator and/or the frame may cause the actuators to continue to move several increments. However, because of uninterruptable power supply 30, power continues to be applied to encoders 22, 24, and 26, as well as interface circuit 28. When power is restored, the controller causes data latches 74 to latch in the present position of the frame drive actuators as recorded by the counters. That position information is then provided to controller 20 through data lines 76. The present position is compared by the controller with the desired position which is stored in the non-volatile memory 32. If the positioned information is the same, then the frame drive actuators are enabled by the controller to run normally when the machine is started. If there is a deviation in the posltioned information, then the controller causes the frame drive actuators to move to the desired position before start-up can begin. The encoders and counting circuits are on uninterruptable power, so they are not affected when the power is interrupted.

The computer always compares the target data with the position data before the embroidery machine will start. Each time the embroidery machine is stopped for any reason (including power loss), the frame must be in the proper position before it can be started again. Thus, there is provided an accurate and inexpensive system for ensuring that the embroidery frame is in the proper position after a power failure before re-start.

From the foregoing description of the preferred embodiment of the invention, it will be apparent that many modifications may be made therein without departing from the true spirit and scope of the invention.

I claim:

1. A system for providing position indication of an electronically controlled embroidery machine after interruption of normal power, comprising:
    a embroidery machine frame;
    at least one actuator for initiating the movement of said frame;
    a controller connected to said actuator; said controller adapted to be programmed to provide commands to said actuator for causing movement of said frame; said controller including a memory, at least a portion of which being non-volatile; said memory adapted to store the last command to said actuator;
    a position encoder connected to said actuator and to said controller; said position encoder providing the current position of said actuator to said controller;
    a substantially uninterruptable power supply; said power supply being connected to said position encoder;
    said controller adapted to compare position information from said memory with position information provided by said encoder after the interruption of normal power.

2. A system as set forth in claim 1, further including a plurality of actuators; a position encoder connected to each actuator, each of said position encoders connected to said controller.

3. A system as set forth in claim 1, further including means for inhibiting the start-up of said actuator if the comparison of portion information indicates that said information is not identical.

4. A system as set forth in claim 3, further including means for providing indication that said command position information is not identical.

5. A system as set forth in claim 4, further including means for driving said actuator to the position required in the non-volatile memory before normal start-up of said system.

6. A system as set forth in claim 1, further including the interface circuit connected between said encoder and said controller, said interface circuit including means for counting discrete movements of said actuator.

7. A system as set forth in claim 6, wherein said interface circuit includes means for counting revolutions of said actuator.

8. An interface circuit as set forth in claim 6, wherein said interface circuit includes means for determining the direction of movement of said actuator.

9. An interface circuit as set forth in claim 6, wherein at least of portions of said interface circuit are connected to said substantially uninterruptable power supply.

10. A system as set forth in claim 1, wherein said non-volatile memory of said controller is connected to a battery.

11. A system as set forth in claim 1, wherein said substantially uninterruptable power supply is a battery.

12. A system as set forth in claim 6, wherein said encoder is a quadrature encoder providing a pair of square wave outputs.

13. A system as set forth in claim 6, wherein said interface circuit includes logic means for analyzing the output signal from said encoder at predetermined ties; said interface circuitry further including a counter circuit connected to said logic means; data latches connected to the output of said counter means for locking in the current position count when power is restored.

14. A method for providing position indication for an electronically controlled embroidery machine after normal power has been interrupted, the embroidery machine including a frame and at least one drive actuator connected to the frame and a controller for controlling the drive actuator, comprising the steps of:
    providing desired frame position information to the controller;
    storing said desired position information in a non-volatile memory associated with said controller;
    providing actual frame position from said actuator to said controller by means of a position encoder after a power interruption;
    comparing said actual position information with said desired position information;
    inhibiting the restart of the embroidery machine if the compared information is different;
    moving the actuator to the position of the desired information, should said information be different.

15. The method as set forth in claim 14, further including the step of counting discrete movements of said drive actuator by determining the actual position of said actuator and then the frame.

* * * * *